(No Model.) 2 Sheets—Sheet 1.

A. F. SPARKS.
AUTOMATIC GRAIN SCALE.

No. 348,066. Patented Aug. 24, 1886.

Attest
J. Watson Sims
J. Simpson Roebuck Jr.

Inventor
Albert F. Sparks
by Wood & Boyd
his Attorneys &c (No Model.) 2 Sheets—Sheet 2.

A. F. SPARKS.
AUTOMATIC GRAIN SCALE.

No. 348,066. Patented Aug. 24, 1886.

Attest
J. Watson Sims
J. Simpson Roebuck Jr.

Inventor
Abert F. Sparks
by Wood & Boyd
his Attorneys

UNITED STATES PATENT OFFICE.

ALBERT F. SPARKS, OF DAYTON, OHIO, ASSIGNOR OF ONE-HALF TO HUGH W. KIMES, OF SAME PLACE.

AUTOMATIC GRAIN-SCALE.

SPECIFICATION forming part of Letters Patent No. 348,066, dated August 24, 1886.

Application filed April 10, 1886. Serial No. 198,473. (No model.)

*To all whom it may concern:*

Be it known that I, ALBERT F. SPARKS, a resident of Dayton, in the county of Montgomery and State of Ohio, have invented certain new and useful Improvements in Automatic Weighing-Scales, of which the following is a specification.

My invention relates to automatic weighing-scales especially adapted to weigh grain.

One of the objects of my invention is to provide a scale which will weigh and discharge grain automatically by the weight of the grain passing through the scales. It is so constructed as to avoid shocks and jars and avoid tipping the buckets.

Another object of my invention is to provide means for cushioning the discharging apparatus, so that it moves without shock.

Another important object of my invention is to provide a scale which with one adjustment of the weights can be adjusted to weigh fast or slow by the regulation of the speed of the discharging levers and valves.

Another object of my invention is to provide a rapid, quick operating cut-off for the grain-spouts, which will, as soon as the scale is turned, cut off all supply of grain instantly, having suitable means to regulate the speed of the discharge, so that the weigher may be adjusted to weigh either a small or a large number of bushels per hour, without affecting the accuracy of the weighing and without regulating the flow of the grain through the feed-spouts into the weigher.

The features of my invention will be specifically set forth in the description of the accompanying drawings, making a part of this specification, in which—

Figure 2:
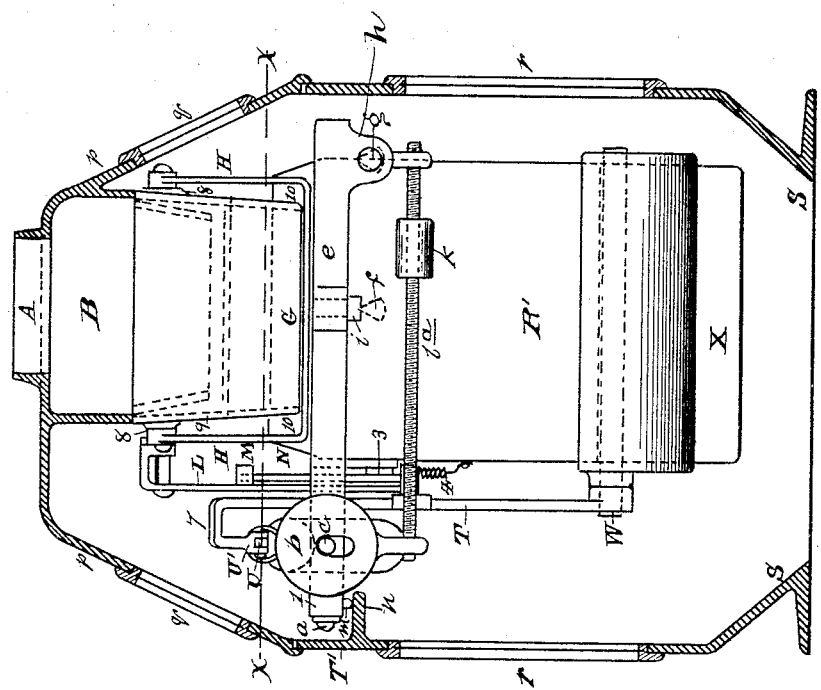
Figure 1:
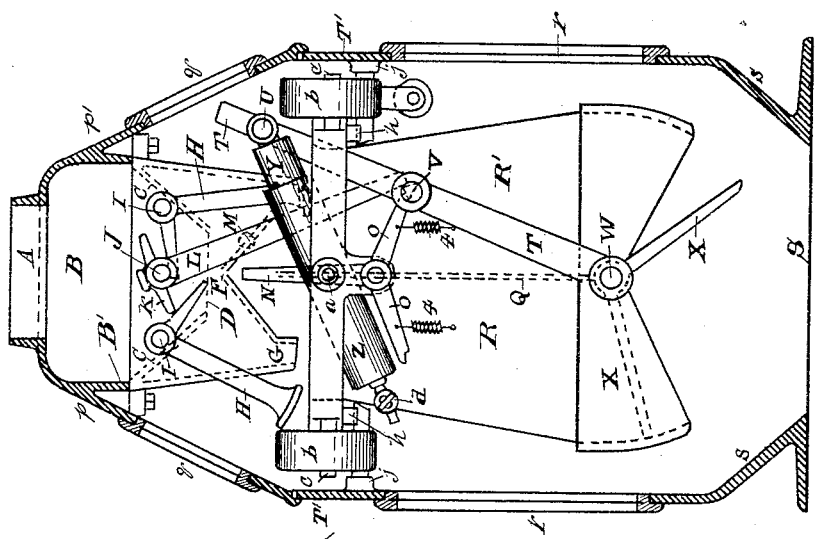
Figure 7:
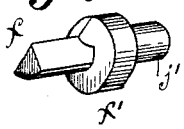
Figure 3:
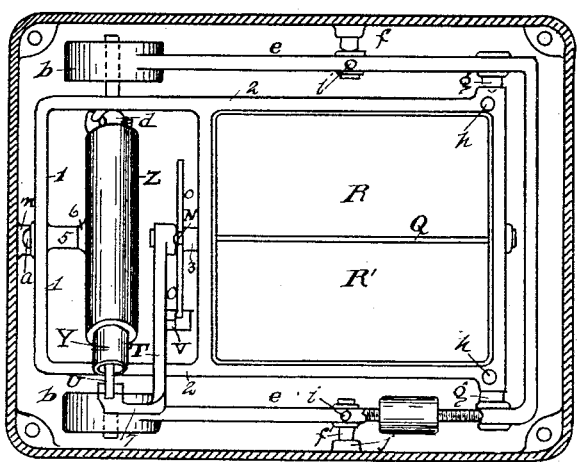
Figure 4:
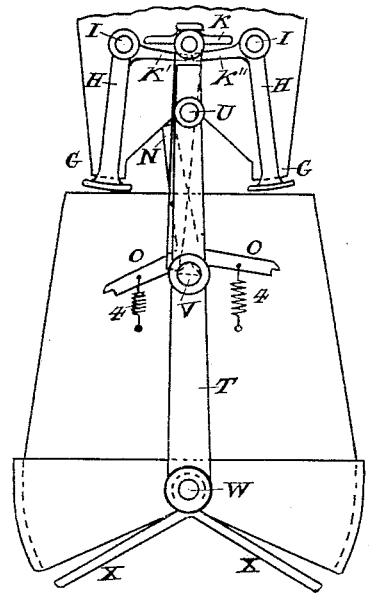
Figure 5:
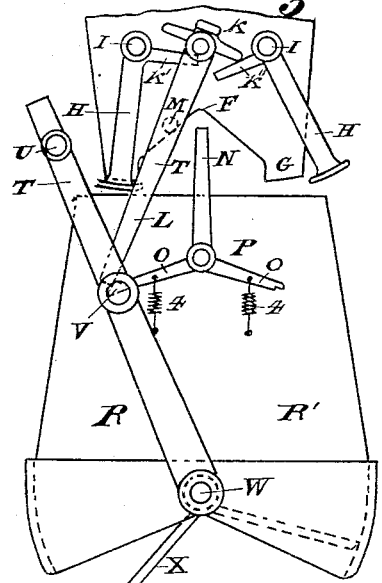
Figure 6:
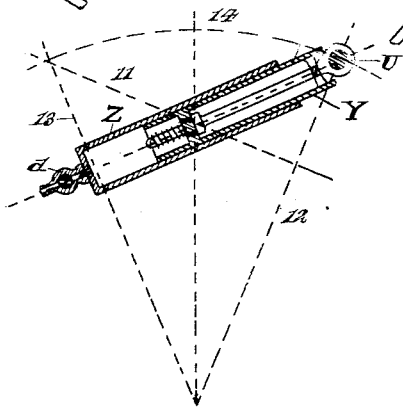

Figure 1 is an end elevation, partly in section, of my improvement. Fig. 2 is a side elevation, partly in section, with the side of the casing removed. Fig. 3 is a plan view on line $x$ $x$, Fig. 2, with the hopper and cut-off valves removed. Fig. 4 is a diagram showing the position of the cut-off valve-levers, the discharge valve-lever at its central point of travel. Fig. 5 is a diagram illustrating the cut-off levers and discharge-lever in the position opposite to that shown in Figs. 1 and 2. Fig. 6 is a longitudinal sectional view of the regulating-cylinder, with lines showing its extreme points of oscillation. Fig. 7 is a perspective view of one of the knife-bearings.

S represents the base of the shell or frame of my weighing device.

$r$ represents frames formed in the sides, in which glass is inserted, so as to allow observation of the working of the parts.

T' represents a portion of the frame formed over the glass frames $r$.

$p$ $p'$ represent the dome of the frame.

$q$ represents the glass frames in the dome, so as to allow observation of the operation of the feed-spout and valves.

A represents the spout for connecting the device to the grain-bin spout.

B represents a chamber above the feed-spouts of the weigher.

C represents a converging spout for directing the grain to the central portion of the feed-spouts G G.

F represents a ridge or saddle, formed centrally under the opening D, so as to divide the compartments into two hoppers converging to the feed-spouts G G.

Within the frames the grain-bucket is suspended by the following instrumentalities: $e$, Figs. 2 and 3, represents a U-shaped scale-beam, which is suspended upon knife-bearings $f$, which engage with notches in the boss $i$, as shown in Fig. 2. $f'$ represents bosses formed on the stud $j'$, which are seated in the boss $j$ of the frame T' upon either side thereof, as shown in Figs. 3 and 7. R R' represent bucket-compartments, which are equally divided by the partition Q. These buckets are suspended upon the U-shaped scale-beams by means of the knife-edge bearings $g$ $g$, engaging notches in the lugs $h$, projecting down from the scale-beam, as shown in Figs. 1 and 3. These knife-edge bearings are constructed and attached in a similar manner to those shown for connecting the scale-beam to the frame. $n$ represents an inwardly-projecting lug on the frames T'. $m$ represents a lug projecting down from the extension-frame 1 of the double bucket R R'. 2 represents U-shaped extensions forming bars for connecting the scale-beams $e$ to the bucket-frame by means of studs $c$, which limit the movement of the scale-beam. $b$ represents an increase of thickness of the free ends of said beams, (shown in Fig. 3,) to increase the weight thereof. These free ends of the scale-beam rest on the studs c, so as to allow the scale-beam and bucket to move, as will be hereinafter explained. X X represent valves for opening and closing the bottom of the buckets. They are attached to a rock-shaft, W, which journals in the sides of the bucket-frame centrally under the division Q. T represents a tripping and setting lever rigidly connected to the journal-shaft W. V represents a triangular boss projecting inwardly from said lever T, so as to serve as a catch. N represents an oscillating catch-lever provided with the arms O O, and journaling on the stud P. It is affixed to boss 3, attached to the bucket. 4 represents retractile springs, one end of each of which is attached to the arms O O, and the other end to the sides of the bucket, so as to bring the lever N normally into a vertical position. When in this position one of the arms O engages with the V-shaped boss on the lever T, and holds it in position on one side or the other until released, as will be hereinafter explained. Z represents a cushioning-cylinder. It is journaled in the extension-frame 1 by the center 5, which projects into a boss, 6, attached to the cylinder Z. d represents an air-escape nozzle at the lower end of the cylinder Z, which is provided with a regulating and cut-off cock, as shown in section, Fig. 6. Y represents a piston reciprocating in the cylinder Z. U represents a connecting-pin for connecting the lever T to the piston Y. 7 represents a goose-neck extension of said lever T, the end of which is bifurcated to engage over the ear U' for the journal-connection of the lever.

The feed-valves and cut-off devices are constructed as follows: L represents a central lever journaled on stud J, which projects out from boss 8, affixed to the outer shell of the hopper, as shown in Fig. 2.

The upper end of said lever L is provided with arms K, for locking and releasing the grain cut-offs. H H represent U-shaped weighted levers, which journal on studs I, which project outwardly from the shell 9 of the hopper-frame, and are provided with oppositely-projecting arms K' K'', with which the arms K of lever L engage for locking and releasing the grain cut-off. These levers pass around the hopper and under the feed-spouts, as shown in Fig. 2. 10 represents a cut-off board or lining upon the inside of the bale of levers H, so as to close over the open end of the feed-spouts G when the levers H are in a vertical position, as shown in Fig. 4. M represents a boss attaced to the lever L, and projecting inward, as shown in Fig. 2, against which the lever N engages in its movement to release catch V, as will be hereinafter explained. $1^n$ represents a screw-threaded arm projecting under one of the arms of the scale-beam e, as shown in Fig. 2. $k$ represents the weight screw-threaded upon said arm $1^n$, for adjusting the same backward and forward, to regulate the amount of grain in the buckets necessary to turn the scale-beams and automatically trip the setting-lever L.

The operation of my scale is as follows: The setting-lever T is moved into the position —say, as shown in Fig. 1—swinging lever L, which is caught by catch V, and thereby causing its arms K to act upon the arms K' and K'' of the levers H, whereby the cut-off is brought under the feed-spout supplying bucket R' and removed from beneath the feed-spout supplying bucket R. The arm O engages with the catch V, closing the valve of the bucket R and bringing the arm K against the arm K' of the weighted lever H, to which the cut-off is attached for the grain-spout supplying the bucket R. This moving of the levers T and L opens said feed-spout. The arms K K' hold it open, so that grain may be fed into the bucket or compartment R. The opposite lever, H, for the feed-spout delivering material to the bucket R', is closed automatically by the weighted lever or cut off H. The weight $k$ is adjusted so as to balance the desired quantity of grain in the compartment R. As soon as this compartment is filled so as to turn the scale-beam the bucket R R' moves downward a sufficient distance by the rocking of the scale-beam e on the knife-bearings $f$, the U-shaped end of the scale-beam e descending and the weighted ends b rising. Slots are pierced through the weighted ends b so as to allow them to rise over their studs c. One end of the buckets being suspended on the knife-bearings g and the other end on the lug n, one end of the scale-beam e rises and the other falls with this descent of the bucket R R', releasing the lever L from the catch V. The lever T, being attached to the bucket, descends with it, and when it drops far enough it releases the locking-lever L, which drops by gravity into the central position shown in Fig. 4, the lever T oscillates to the left, the catch V passing under arm O, and striking the opposite arm O in its travel, and passing under the same until the notch in said opposite arm O engages with the opposite edge of the catch V. During this movement of the lever T catch V has engaged with the opposite side of the lever L and carries it forward into the position shown in Fig. 5. As soon as lever L drops into the central position shown in Fig. 4 both cut-offs H occupy a central position, due to the gravity of the levers, when the locking-arms K K' are released, dropping by gravity into a vertical position. Thus, as soon as the lever L is released from the catch V, the grain is instantly cut off, and were not the valve X and lever T partially counterbalanced the lever T would move instantly into its opposite position and create a ramming or jerking motion on account of the weight of grain in compartment R. To avoid this, the cock in the discharge-orifice d of the cylinder Z is sufficiently closed to check the movement of the piston Y. As lever T moves it forces the piston Y inward accordingly and oscillates the cylinder Z on its center $a$, until it comes into the position shown by line 11 in the diagram Fig. 6, forcing piston Y inward, as stated. The lever T moves from the position shown in line 12 to the position shown in line 13. The speed of the movement of the lever T and the oscillating cylinder and piston may be regulated to any degree by means of the cut-off cock $d$ at the foot of the cylinder, thus cushioning by the compression of air in the cylinder Z the movement of the lever T and preventing shocks. Therefore, while lever L instantly drops to its central position, allowing the lever H and the cut-off valves to cover the feed-spouts, the lever T, the oscillating cylinder, and the bucket-valves X move more slowly. As soon as the lever T arrives at its central position, shown by line 14 in Fig. 6, or the vertical line through the bucket, its catch V engages with the lever L, carrying it forward into the position shown in Fig. 5, causing one of its arms K to engage with the arm K″ of the lever H. This moves said weighted arm or lever H outward, as the arms K K″ are depressed, bringing them into the position shown in Fig. 5, which opens the feed-spout that supplies the compartment R′. This movement of the lever T past the center has opened the discharge-valve for bucket R and closed the discharge-valve for the bucket at the compartment R′, so that the bucket R′ commences to fill just before the bucket R has been completely discharged. When bucket R′ is filled sufficiently to depress the buckets and the lever T, the lever L is disengaged from the boss V, and it drops into its vertical position, and the lever T oscillates backward, carrying the feed-valves and levers into the position shown in Fig. 1. A very important result is accomplished by the use of this cushioning-cylinder, setting-lever T, and weighted lever L. First, the feed-spouts are instantly closed by the release of the lever L from its catch V; second, the speed of the lever T can be regulated to move fast or slow without affecting the instant of cut-off or varying the quantity of grain weighed whether the lever T moves fast or slow. As the lever T regulates the time of the opening of the feed-spouts, and as this opening of the feed-spouts does not commence until the lever T has reached and passed the vertical central line, and as it opens with the speed of the movement of the lever T, the cut-off of the feed-spout will be moved backward to allow the grain to flow just in proportion to the speed of the travel of the setting-lever T, which does not affect the tipping of the scale-beam nor the quickness of the operation of cutting off the flow of grain into the opposite bucket. Hence, when once the weight $k$ is adjusted to weigh a given amount of grain the speed of weighing can be regulated by means of the air-cock at the foot of the cylinder without affecting the accuracy of the weighing, and at the same time a uniform movement of the lever T and the bucket-valves is always obtained by the cushioning of the piston Y in its cylinder, and avoiding all shocks and jars upon the weighing apparatus. Thus, for this reason, a more accurate result of weighing is obtained, at the same time the machinery wears much longer, with very little liability of getting out of repair. It will also be seen that the momentum of the grain through the feed-spout is always the same, instead of being variable, as in devices where the speed of weighing is regulated by regulating the amount and momentum of the grain passing through the feed-spouts into the bucket.

Having described my invention, what I claim as new is—

1. In an automatic weighing-scale, the combination, with a scale-beam, of buckets having openings in the bottom, valves closing and opening the same, a setting-lever, T, oscillating on a center, and a catch locking said lever and automatically released by the descent of the bucket, the lever T being connected with the valves of the feed-spouts by a lever having arms actuating said valves, substantially as described.

2. In an automatic weighing-scale having two compartments, the combination, with valves opening and closing the same, of a setting-lever, the cushioning oscillating cylinder, and piston connected to and oscillating with the setting-lever, and the scale-beam, substantially as described.

3. In a weighing-scale, the combination, with the setting-lever T, the automatic locking-lever N, and arms O, adapted to automatically lock and release the setting-lever by the descent of the bucket and lever, substantially as specified.

4. In combination with the weighted arms H H and the gravitating-lever L, the setting-lever T, adapted to engage with said lever L and alternately operate the feed-spout cut-offs, substantially as specified.

5. In combination with the buckets and scale-beams of a grain-weigher, the cushioning cylinder and piston carried upon the bucket-frame and attached to the bucket-discharging mechanism, whereby the movement of the latter is cushioned to regulate its speed without affecting the feed cut-offs, substantially as specified.

6. A grain-weigher in which the weighing-bucket is suspended upon a scale-beam, having the weighing-speed controlled by the cushioning-piston connected to the bucket-discharge mechanisms, and having an adjustable cock for regulating the speed of the cushioning mechanism, substantially as specified.

7. In combination with a two-compartment bucket, the lever T, the valves X, the catch V, engaging alternately with the arms O, and the lever L, for alternately opening and closing the said discharge-valves by the oscillation of the setting-lever T, substantially as specified.

8. In a grain-weigher, the combination of two feed-spouts, each operated by cut-off levers, and two buckets with valves opening and closing the same by the oscillation of the lever T, journaled to said bucket and hung upon a scale-beam provided with catch devices, which automatically release the setting-lever T, which is oscillated by the gravity of the grain in the bucket to alternately open and discharge the contents of one bucket and close the other bucket for a second charge, substantially as specified.

9. In combination with the oscillating cylinder Z, journaled upon the gravitating bucket-frame, and the piston Y, driven by an oscillating setting-lever, the regulating air-cock connected to the cylinder for controlling the escape of the air and regulating the speed at which the piston and lever travel, substantially as specified.

In testimony whereof I have hereunto set my hand.

ALBERT F. SPARKS.

Witnesses:
ROBERT ZAHNER,
M. E. MILLIKAN.